(12) United States Patent
Yang

(10) Patent No.: US 6,595,390 B1
(45) Date of Patent: Jul. 22, 2003

(54) METHOD AND APPARATUS FOR DISPENSING FLUID DOSES

(75) Inventor: Feng-Yi Yang, Taipei (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 348 days.

(21) Appl. No.: 09/243,020

(22) Filed: Feb. 3, 1999

(51) Int. Cl.[7] ................................................. B67D 5/08
(52) U.S. Cl. .......................... 222/63; 222/642; 222/271; 137/565 B; 417/3
(58) Field of Search .............................. 222/1, 63, 642, 222/643, 255, 278, 271; 137/565.33, 565.31, 565.29; 417/3, 12, 426

(56) References Cited

U.S. PATENT DOCUMENTS

| | | | | |
|---|---|---|---|---|
| 1,563,337 A | * | 12/1925 | Caputo ........................... 417/3 |
| 2,945,445 A | * | 7/1960 | Smith et al. | |
| 4,216,879 A | * | 8/1980 | McMillin ........................ 222/1 |
| 4,329,120 A | * | 5/1982 | Walters | |
| 4,832,073 A | * | 5/1989 | Campau ................. 137/565.33 |
| 5,429,270 A | * | 7/1995 | Tumminia ...................... 222/1 |
| 5,560,523 A | * | 10/1996 | Chaki et al. | |
| 5,566,709 A | * | 10/1996 | Fujii et al. ............. 137/565.33 |
| 5,941,417 A | * | 8/1999 | Andersson et al. ........... 222/64 |
| 5,974,345 A | * | 10/1999 | Buck et al. ............ 700/479.09 |
| 5,999,888 A | * | 12/1999 | Aubee ......................... 702/45 |

* cited by examiner

Primary Examiner—Christopher Kim
(74) Attorney, Agent, or Firm—Tung & Associates

(57) ABSTRACT

A method and apparatus for dispensing fluids includes first and second fluid pumps coupled with a source of the fluid. Each of the pumps includes a flow switch for sensing output flow from the associated pump. When one of the pumps malfunctions, the associated flow switch produces a fault signal which triggers a controller to activate the second pump to complete the dispensing of a dose of fluid from the source. A timer measures the duration of the flow from each of the pumps so that a full dose of fluid is dispensed from the two pumps in the event that one of the pumps malfunctions.

11 Claims, 2 Drawing Sheets

METHOD AND APPARATUS FOR DISPENSING FLUID DOSES

TECHNICAL FIELD

The present invention relates to methods and apparatus for dispensing fluid in pre-selected quantities or "doses", and deals more particularly with a method and apparatus for dispensing fluid doses employing multiple pumps to provide back up pumping capability in the event of a pump malfunction.

BACKGROUND OF THE INVENTION

Various types of industrial systems often employ apparatus for dispensing pre-selected, discrete amounts or "doses" of a fluid medium for any of various purposes. For example, in connection with semiconductor manufacturing operations for producing semiconductor wafers, wet etching equipment produces waste-water, the pH value of which must be controlled. This is usually accomplished by measuring the pH of the waste-water, and adding doses of an alkaline liquid to the waste-water, from time to time so that the pH level of the waste-water is maintained above some pre-selected, minimum level.

In the past, the alkaline liquid was maintained in a separate tank, and a single pump was used to pump the alkaline liquid from a container thereof into the waste-water tank. In the event that the pump malfunctioned for some reason, and stopped pumping, an audible or visual alarm was issued, thereby alerting the operator that a fault or malfunction had occurred somewhere in the dosing system. Once the operator finally identified the pump as being the component in the system that was out of order, he would manually switch to another pump in order to resume the dosing operation, however the operator did not know at the time of the current malfunction, how much of the alkaline liquid, as a part of the total dose, had been dispensed. Furthermore, in some cases the entire semiconductor line had to be shut down in order to specifically isolate and correct the pump problem, thus reducing processing throughput. In addition to these shortcomings, the prior art process for troubleshooting and correcting pump malfunctions was subject to operator error.

Accordingly, there is a clear need in the art for an improved method and apparatus for dispensing fluid doses which overcomes each of the deficiencies discussed above. The present invention is directed towards satisfying this need.

SUMMARY OF THE INVENTION

According to one aspect of the invention, apparatus is provided for dispensing doses of a fluid including first and second pumps coupled with a source of the fluid to be dispensed. Each of the pumps has a fluid output for delivering fluid to a destination, such as a tank of a second fluid. First and second sensing means are respectively provided on the pump outputs to sense when the associated pump is pumping fluid, and is thus operating properly. When either of the pumps malfunctions, and fails to output fluid, the sensing means produces a fault signal which is delivered to electrical control means which responds to either of the fault signals by activating the other pump, thereby providing automatic switching of the two pumps so as to prevent interruption of fluid delivery, and assuring that a full fluid dose is dispensed. The sensing means preferably comprises a fluid switch, such as a butterfly valve acting on an electrical switch. The electrical control means preferably comprises a programmable logic controller, including timing means for timing the duration of fluid delivery from either of the two pumps.

According to another aspect of the invention, apparatus is provided for dispensing doses of a first fluid into a container of a second fluid, comprising first and second fluid pumps coupled with a source of the first fluid for pumping a dose of the first fluid from the source to the container, such time duration being related to the dose of the first fluid being delivered to the container. The apparatus also includes means for sensing when either of the pumps malfunctions, and produces an electrical signal which is delivered to a programmable logic controller controlling each of the pumps. Upon receipt of a fault signal, the programmable logic controller activates the second, back-up pump to assure a full fluid dose is dispensed, and the dispensing process continues without interruption.

According to still another aspect of the invention, a method is provided for dispensing doses of a fluid comprising the steps of:

providing first and second pumps for pumping the fluid;

pumping the fluid from the source using the first pump;

sensing the flow of the fluid pumped from the first pump;

issuing a fault signal when the first pump malfunctions; and, activating the second pump to pump fluid from the source in response to the issuance of the fault signal.

According to yet another aspect of the invention a method is provided for dispensing doses of a fluid, comprising the steps of:

pumping doses of a fluid from a source of the fluid using a first pump;

sensing when the first pump malfunctions; and, activating a second pump when a malfunction is sensed, in order to pump doses of the fluid using the second pump.

Accordingly, it is a primary object of the present invention to provide apparatus for dispensing doses of a fluid providing high reliability of operation, and continuous, uninterrupted dispensing of the fluid in the event of a pump malfunction.

A further object of the invention is to provide apparatus as mentioned above which provides automatic switch-over from a primary pump, to a back-up pump in an automatic manner, without operator intervention, so as to eliminate down time, and the possibility of operator error in correcting a malfunction.

A further object of the invention is to provide apparatus as mentioned above in which the switch-over to the back up pump is carried out automatically using a programmable logic controller which tracks the amount of fluid dispensed and maintains proper dosage levels, despite a pump malfunction.

A still further object of the present invention is to provide apparatus as described above which includes means for automatically sensing when one of the pumps has malfunctioned.

Another object of the present invention is to provide a method for dispensing doses of a fluid which provides automatic switch-over from a primary fluid pump to a back-up fluid pump in an automatic manner, while maintaining constant, repeatable quantities of fluids dispensed in each dose.

These, and further objects and advantages of the present invention will be made clear or will become apparent during the course of the following description of a preferred embodiment of the present invention.

BRIEF DESCRIPTION OF THE DRAWINGS

In the drawings, which form an integral part of the specification, and are to be read in conjunction therewith, and in which like reference numerals are employed to designate identical components in the various views.

DETAIL DESCRIPTION OF THE PREFERRED EMBODIMENT

Figure 1:
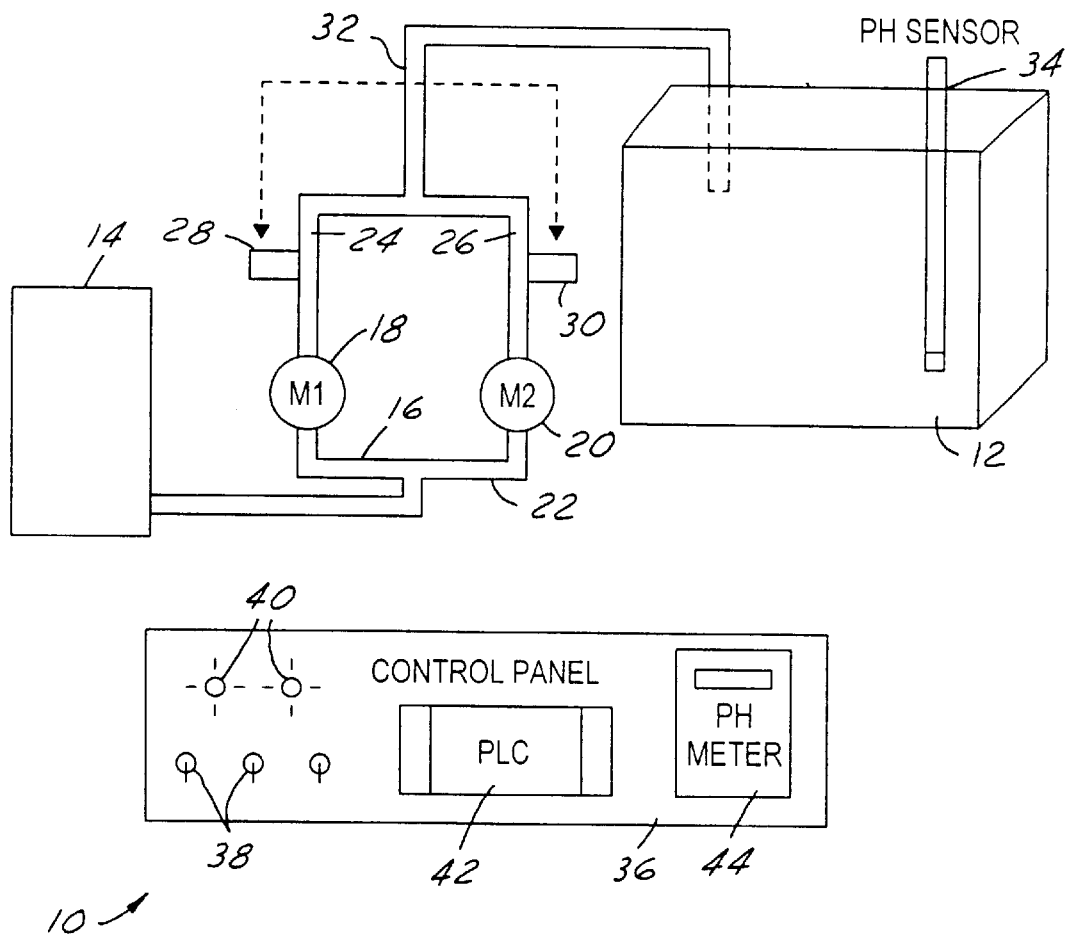
FIG. 1 is a diagrammatic view of a system for dispensing doses of a fluid which forms the preferred embodiment of the present invention, and which may be employed to carry out the novel method forming part of the invention; and, FIG. 2 is a schematic wiring diagram for the programmable logic controller forming part of the apparatus of FIG. 1, and depicting various inputs and outputs to such controller.

Referring first to FIG. 1, apparatus, generally designated by the numeral 10, is shown for dispensing doses of a fluid, such as for example an alkaline liquid, from a source such as a supply container 14. The liquid in container 14 is dispensed either continuously, or from time to time in discrete, pre-selected quantities or "doses" to a destination, which in this case is defined by a container or tank 12 of waste-water whose pH level is to be controlled by the addition of doses of the alkaline fluid from the container 14.

Container 14 is coupled by a pair of supply lines 16, 22 to a pair of electric motor driven pumps 18, 20, each of which are independently controllable, as we will be discussed later. The pumps 18, 20 have a pair of fluid output lines 24, 26 which are interconnected so as to deliver fluid to a common line 32 which in turn carries the fluid to tank 12. Output lines 24 and 26 are respectively provided with fluid flow sensing means in the form of flow switches 28, 30, each of which senses the flow of fluid through the corresponding line and produces an electrical output signal indicative of the state of fluid flow through the lines. Each of the flow switches 28, 30 may comprise, for example, a butterfly type valve mechanically connected to an electrical switch which produces the signal depending upon the valve position. A conventional pH sensor 34 is disposed within the tank 12 and is operable to produce an electrical signal indicative of the pH value of the liquid in tank 12.

A control panel 36 includes a number of components which are electrically connected to the pumps 18, 20, flow switches 28, 30 and to pH sensor 34. The control panel 36 includes a programmable logic controller 42 (PLC) which is of conventional design, and is programmed to control the apparatus in accordance with software written for the particular application. The PLC 42 includes a number of inputs and outputs, as will be discussed below, and has stored. in a memory therein, various control parameters depending on the application, such as algorithms for calculating the dosage of alkaline liquids to be added to the waste-water in tank 12 in order to achieve a particular pH level, the duration of time required to pump the dose from the container 14 to tank 12, and the programmed instructions for activating one of the pumps 18, 20 in a backup mode, when the other of such pumps malfunctions.

The control panel 36 will also typically include a number of manual switches or controllers 38 for setting operating parameters or manually overriding control functions, as well as indicator lights 40 which provide an indication of the operational state of certain of the above discussed components, such as whether the pumps 18, 20 are on or off. Finally, the control panel 36 includes a pH meter 44 which receives signals from the pH sensor 34 to provide a continuous visual display of the pH level of the liquid in tank 12.

In operation, the PLC 42 is programmed such that when the pH level of the waster-water in tank 12 drops to a pre-selected programmed value, the PLC 42 activates one of the pumps 18, 20, thereby pumping fluid from container 14 into tank 12. The duration during which the pumps 18, 20 continue pumping is dependent upon the dosage to be dispensed, which is a function of the pH level sensed by sensor 34, and the amount of the alkaline fluid required to be added to the waste-water in tank 12 in order to achieve a target pH level. This dosage is calculated by the PLC 42, which operates to turn off or deactivate the pump 18, 20 when the desired dosage has been dispensed.

The PLC 42 continuously monitors signals produced by the flow switches 28, 30 and thus senses when the switch 28, 30 of the activated pump 18, 20 changes state, thus indicating that the activated pump 18, 20 is no longer functioning. If this signal is issued by the flow switch 28, 30 prematurely, during the course of a dispensing cycle, then it is interpreted as a fault signal since the pump stops functioning before its normal cycle time-out. Upon receipt of a fault signal from one of the flow switches 28, 30, the PLC 42 automatically activates the other of the pumps 18, 20 so that the flow of fluid from containers 14 to 20 continues, virtually uninterrupted, until the entire dose has been dispensed.

Figure 2:
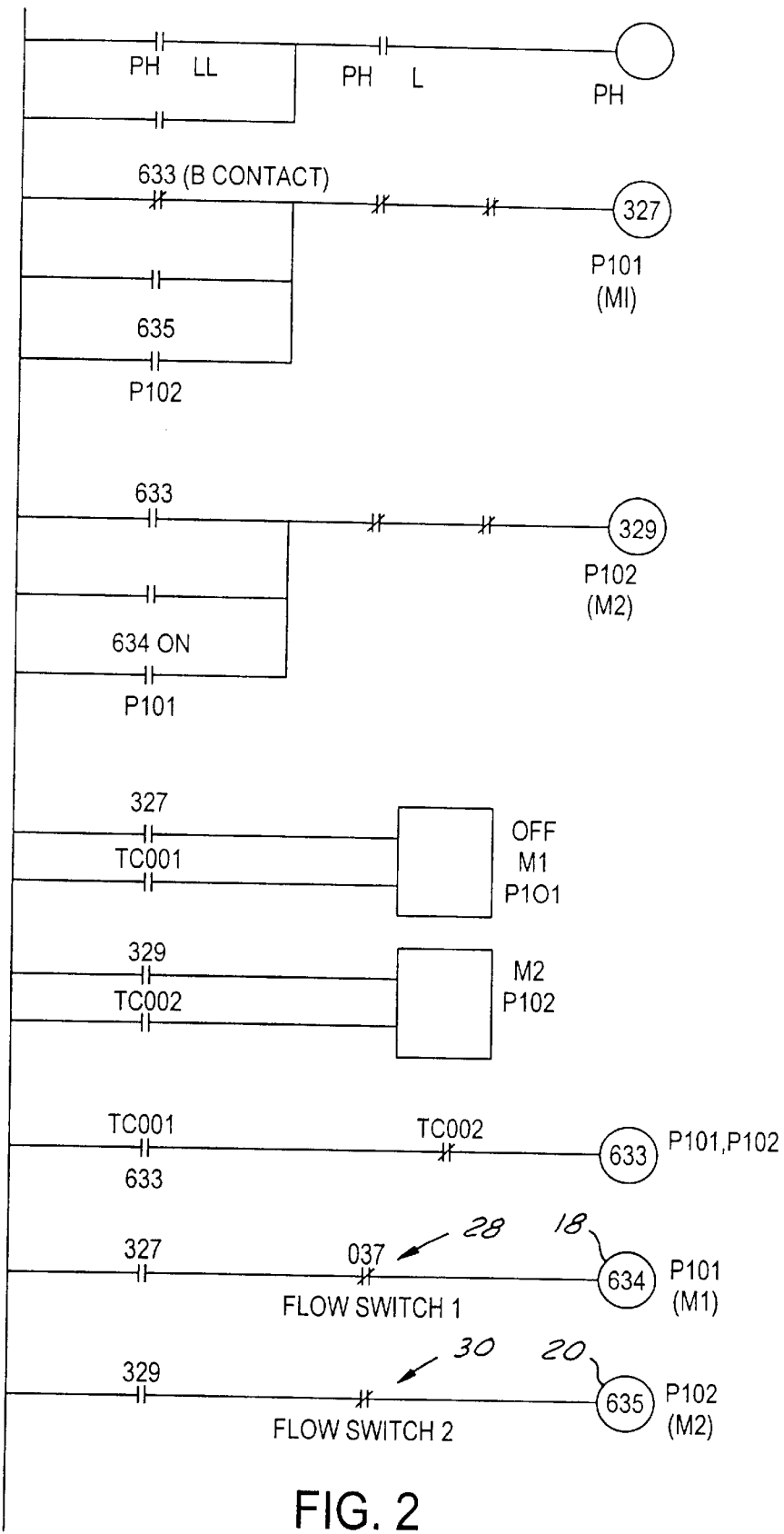

Attention is now also directed to FIG. 2 which is a relay ladder diagram for the programming of the PLC 42 shown in FIG. 1. PLCs are well known in the art, and any of a number of commercially available PLCs may be employed in connection with the present invention. Broadly, PLCs employ the hardware architecture of a computer and a relay ladder diagram language. A programmer is normally temporarily connected to the PLC for the purpose of entering, examining, or editing the ladder diagram logic. Once the logic is established as desired by the operator, the programmer can be disconnected. A central processing unit (CPU) and its associated input/outputs form the primary part of the PLC. The CPU includes a processor, a logic memory and a storage memory. The processor operates upon instructions stored in the logic memory. These instructions are based on the ladder diagram logic entered by the programmer. Essentially, these instructions indicate how the processor is to react to various changes in inputs, and what output to activate or de-energize. The storage memory is used to retain numerical values, such as those used with timing or counting or arithmetic functions. The storage memory may be a physically separate memory, or a portion of a logic memory set aside specifically for numerical storage. The input/output section isolates the CPU from the outside world represented by other components of the system which, in the illustrated embodiment, comprise the pumps 18, 20 and flow switches 28, 30. The relay ladder diagram format of programming is used because of its compatibility with control devices such as relays, timers and counters that PLCs were designed to replace. The use of relay ladder diagrams eliminates the need to introduce a new language at this level of control.

As shown particularly in FIG. 2, when the pH level of the liquid within the container 12 is too low, output 632 from the sensor 34 is turned on. The output designated by the numeral 633 determines whether pump 18 (P101 in FIG. 2) or pump 20 (P102) should be on. The PLC 42 includes a pair of timers TC001 and TC002 respectively associated with pumps 18, 20 which each maintain a count related to the duration of time that the associated pump is pumping fluids. The timers TC001 and TC002 are off (not counting) when their respective counter is not zero and are on when their respective counter is equal to zero. When TC001 is on, output 633 is also on, as is pump 18. When pump 20 is on, contacts 327 are closed, and pump 18 is on. However, even though contacts 327 are closed, when the normally closed contact 037 related to flow switch 28 opens then output 634 is on, which in turn causes output 329 to turn on, thus activating output 635 which actuates the back-up pump 20.

From the foregoing, it is apparent that the apparatus and method for dispensing the fluid doses described above not only provides for the reliable accomplishment of the objects of the invention, but it does so in a particularly economical and efficient manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A system for dispensing doses of a fluid, comprising:
   a source of fluid to be dispensed in doses;
   a first pump coupled with said fluid source for dispensing a dose of said fluid from said source;
   a second pump coupled with said fluid source for dispensing a dose of said fluid from said source;
   first means for sensing when said first pump has malfunctioned and for producing a first fault signal when said first pump malfunctions;
   second means for sensing when said second pump has malfunctioned and for producing a second fault signal when said second pump has malfunctioned;
   programmable logic controller responsive to said first and second fault signals for activating an operation of one of said first and second pumps when the other of said pumps malfunctions.

2. The system of claim 1, wherein each of said first and second sensing means each includes a valve having an open position and a closed position, and means for sensing when said valve is in said closed position thereof.

3. The system of claim 1, wherein each of said first and second sensing means includes means for sensing the flow of said fluid and switch means responsive to said flow sensing means for producing an electrical output signal indicating the operational state of the associated pump.

4. The system of claim 1, wherein said electrical control means includes first and second timer means respectively associated with said first and second pumps for timing the duration that the associated pump is pumping said fluid.

5. The system of claim 1, wherein each of said pumps has an fluid output, and the fluid outputs of said first and second pumps are coupled together to define a common fluid output.

6. A system for dispensing doses of a first fluid into a container of a second fluid, comprising:
   a source of said first fluid;
   first and second fluid pumps each coupled with said source for pumping a dose of said first fluid from said source to said container, only said first pump normally being activated to pump said first fluid;
   timing means for measuring the duration of time either of said pumps is pumping said first fluid from said source to said container, the duration of said time being related to the dose of said first fluid delivered to said container;
   means for sensing when said first pump malfunctions and producing a fault signal indicative of said malfunction;
   control means responsive to said fault signal for activating said second pump to commence pumping said first fluid.

7. The system of claim 6 wherein said sensing means includes a valve having an open position and a closed position, and means for sensing when said valve is in said closed position thereof.

8. The system of claim 7, wherein said sensing means includes means for sensing the flow of said first fluid and switch means responsive to said flow sensing means for producing said fault signal.

9. The system of claim 6, wherein said control means includes a programmable logic controller.

10. The system of claim 6, including means for sensing a condition of said second liquid and for delivering a signal to said control means indicative of said condition.

11. The system of claim 6, wherein each of said pumps has a fluid output, and the fluid outputs of said first and second pumps are coupled together to define a common line for delivering said first fluid to said container from either of said pumps.

* * * * *